H. C. BEHR.
PROCESS OF AND APPARATUS FOR SEPARATING LIQUIDS FROM SOLIDS.
APPLICATION FILED MAR. 29, 1919.
1,336,722. Patented Apr. 13, 1920.
4 SHEETS—SHEET 1.
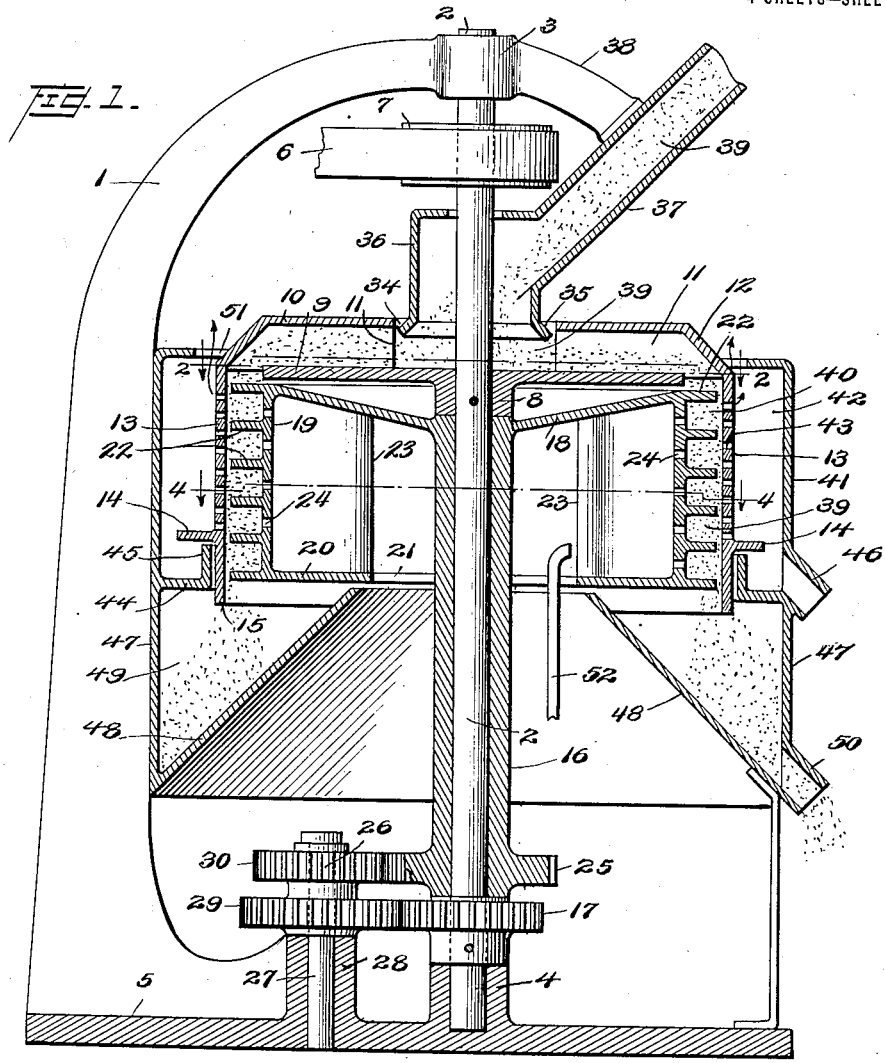
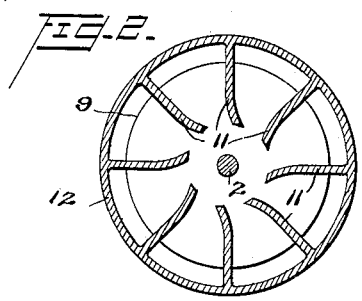
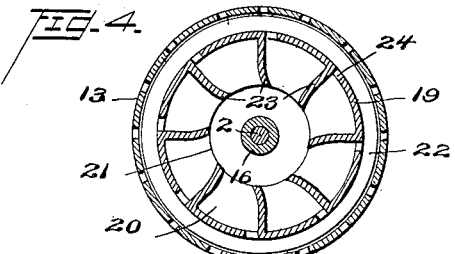
Inventor
Hans C. Behr
By T. A. Witherspoon
His Att'y

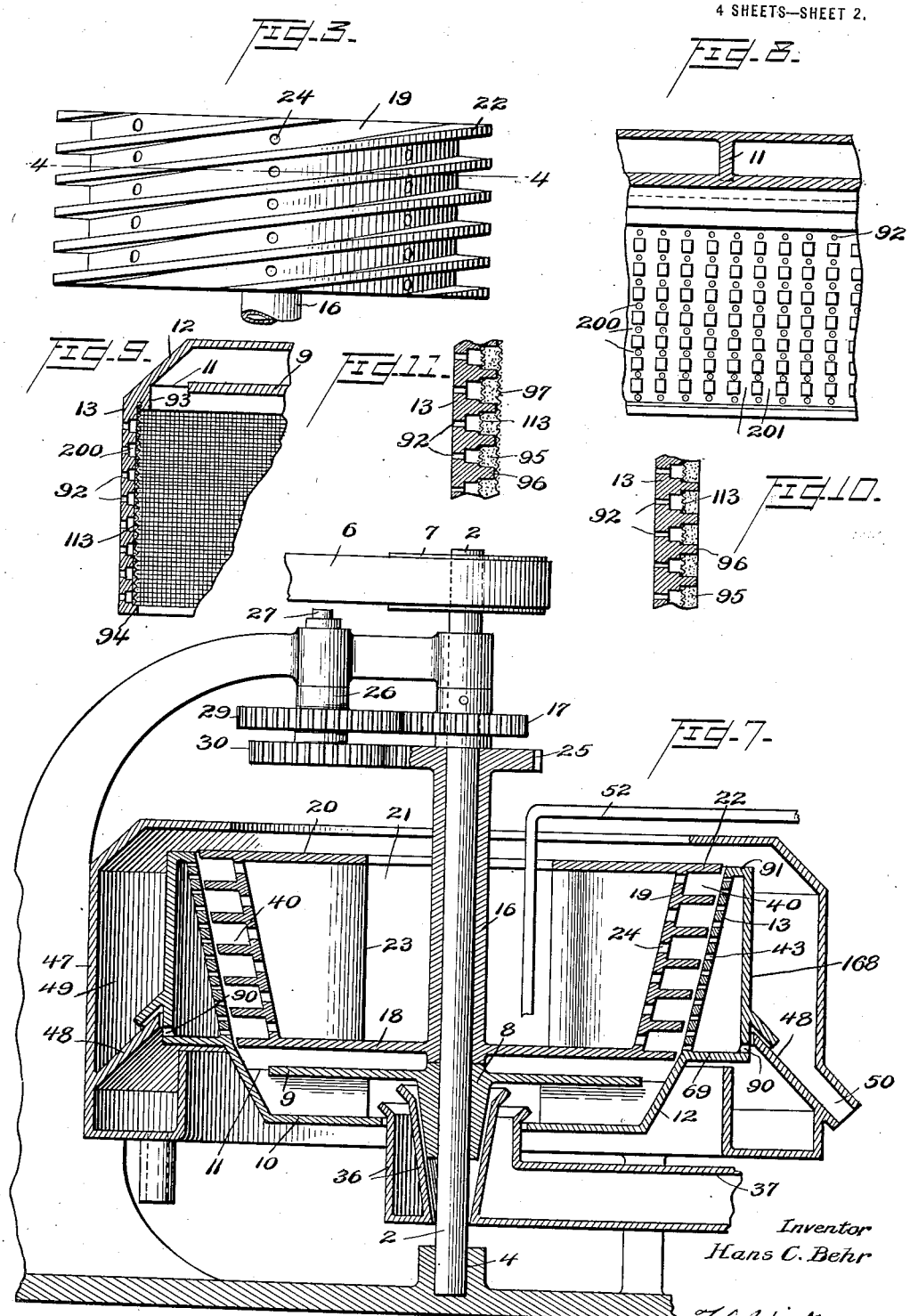

H. C. BEHR.
PROCESS OF AND APPARATUS FOR SEPARATING LIQUIDS FROM SOLIDS.
APPLICATION FILED MAR. 29, 1919.
1,336,722.
Patented Apr. 13, 1920.
4 SHEETS—SHEET 3.
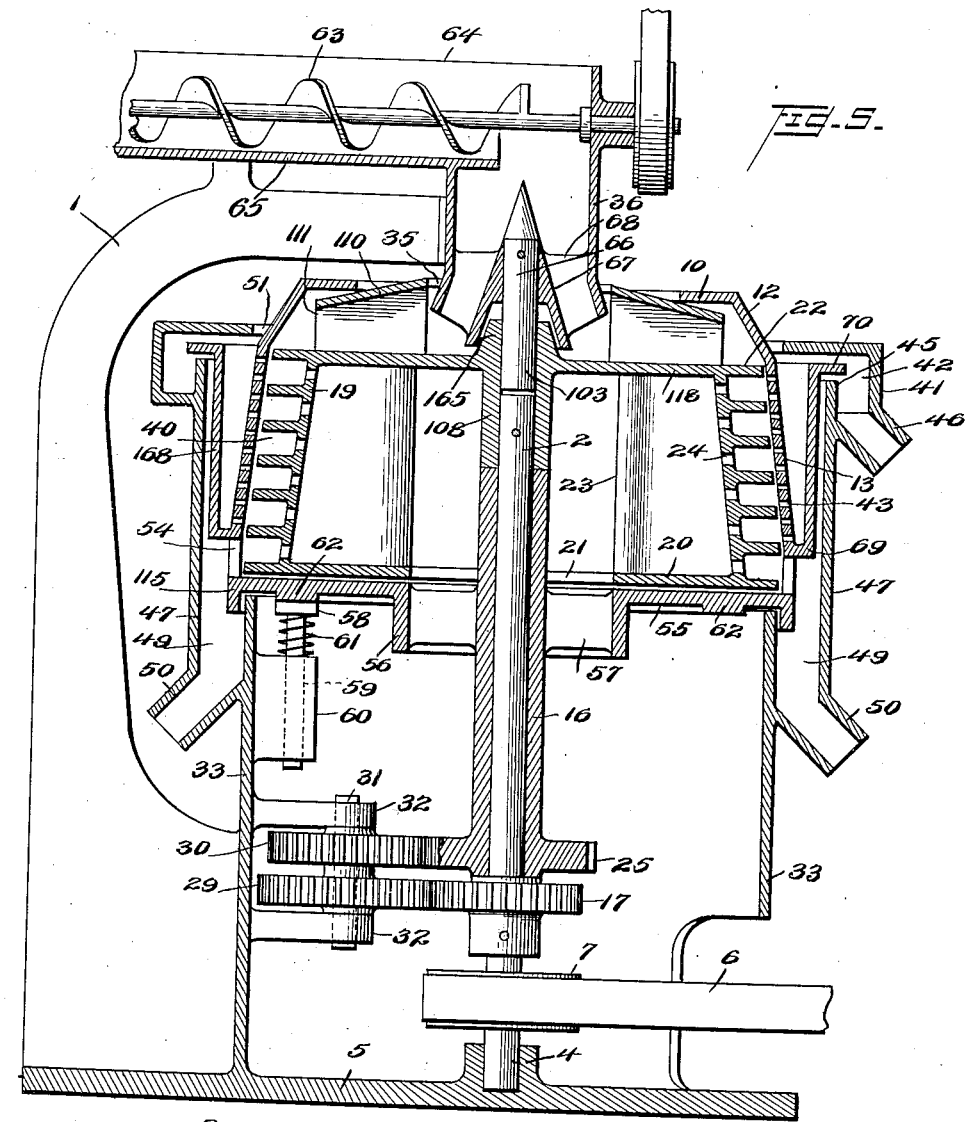
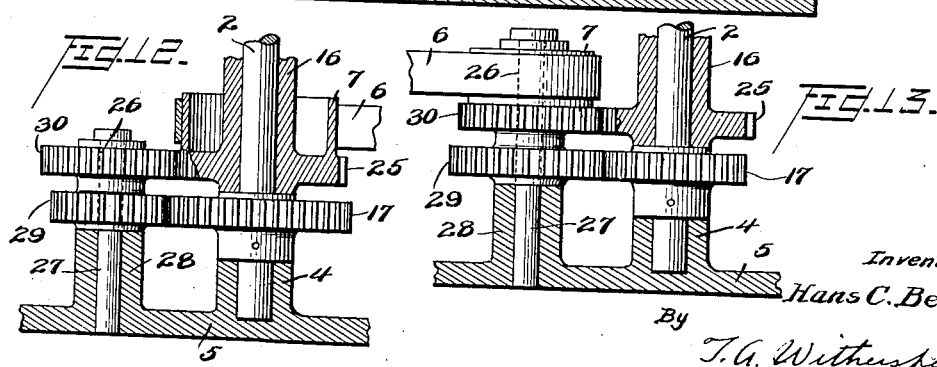
Inventor
Hans C. Behr
By
T. G. Witherspoon
His Atty H. C. BEHR.
PROCESS OF AND APPARATUS FOR SEPARATING LIQUIDS FROM SOLIDS.
APPLICATION FILED MAR. 29, 1919.
1,336,722.
Patented Apr. 13, 1920.
4 SHEETS—SHEET 4.
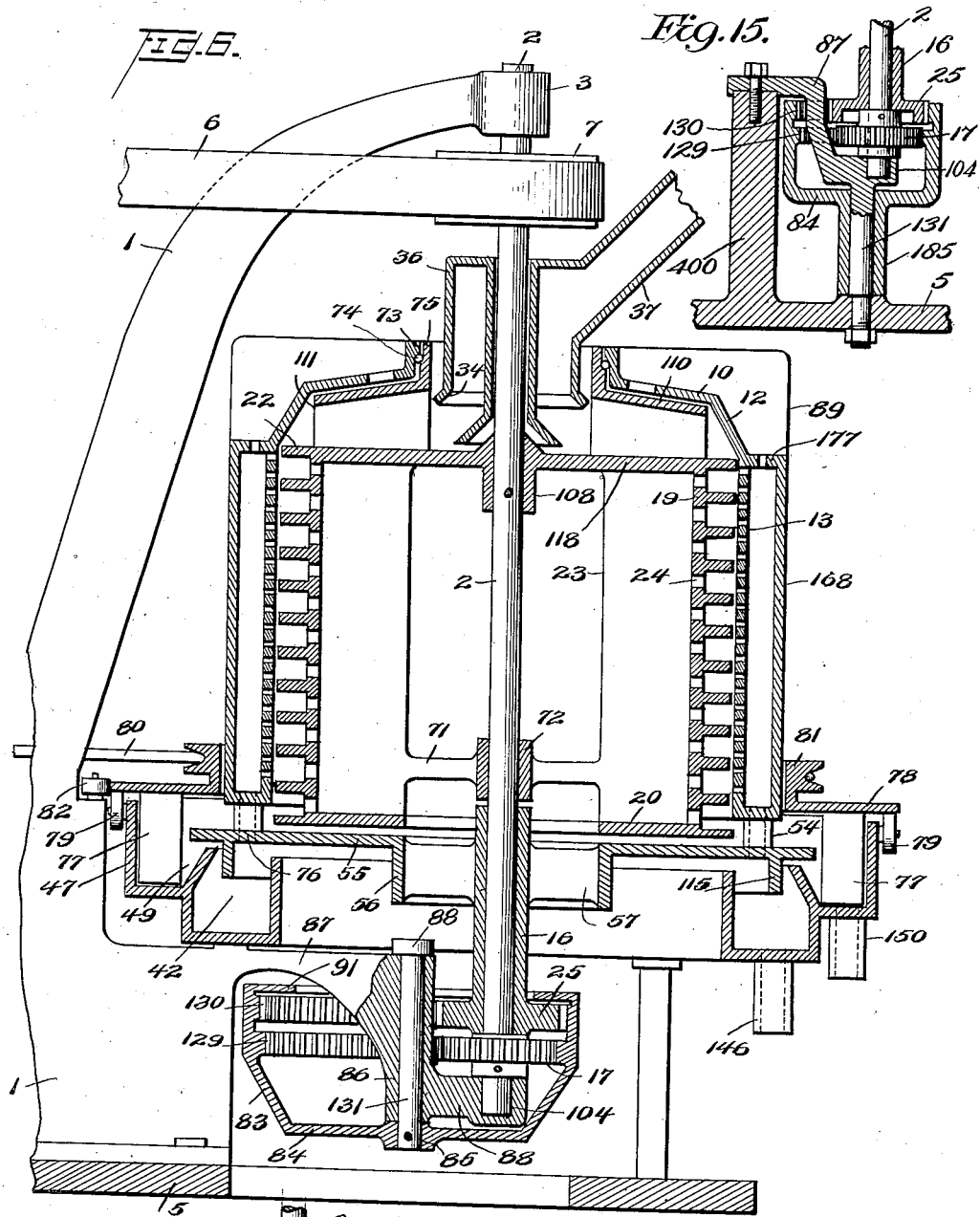
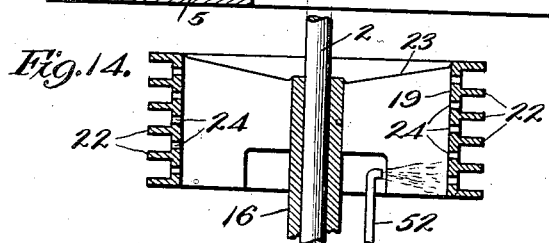
Inventor
Hans C. Behr
By
J. G. Witherspoon
His Att'y

UNITED STATES PATENT OFFICE.

HANS C. BEHR, OF NEW YORK, N. Y.

PROCESS OF AND APPARATUS FOR SEPARATING LIQUIDS FROM SOLIDS.

1,336,722. Specification of Letters Patent. Patented Apr. 13, 1920.

Application filed March 29, 1919. Serial No. 286,003.

*To all whom it may concern:*

Be it known that I, HANS C. BEHR, a citizen of the United States, residing at New York city, in the county of New York and State of New York, have invented certain new and useful Improvements in Processes of and Apparatus for Separating Liquids from Solids; and I do hereby declare the following to be a full, clear, and exact description of the invention, such as will enable others skilled in the art to which it appertains to make and use the same.

This invention relates to a process of and an apparatus for separating liquids from aggregates of solid grains such as salts, sand, sugar, etc., and has for its object to provide a process and an automatic and continuously operating mechanism which will be more efficient in action than those heretofore proposed.

With this and other objects in view the invention consists in the novel steps and combinations of steps constituting the process, as well as the novel combinations of parts constituting the apparatus, all as will be more fully hereinafter disclosed and particularly pointed out in the claims.

Generally stated, the liquids and solids are separated by means of a powerul centrifugal action due to the revolution of certain parts of the mechanism at high speed, and said centrifugal action may if desired be aided by a current of air. Further, the force required to bring the materials being treated up to speed is utilized for relieving the strain and wear on certain parts of the mechanism, as will appear below.

Referring to the accompanying drawings forming a part of this specification in which like numerals designate like parts in all the views—

Figure 1 is a sectional elevational view of one form of apparatus made in accordance with this invention;

Fig. 2 is a sectional plan view taken on the line 2—2 of Fig. 1, showing that portion of the parts illustrated in said figure, which is employed in bringing up to speed the material fed to the machine;

Fig. 3 is an elevational view of the inner mantle shown in Fig. 1, which causes the continuous movement of the material being treated;

Fig. 4 is a sectional plan view taken on the line 4—4 in Figs. 1 and 3, showing the means for impelling the current of air, gas or liquids used in the treatment of the material;

Figs. 5, 6 and 7 are views similar to Fig. 1, showing modifications and variations in the form of application of the invention;

Fig. 8 is a fragmentary elevational view to an enlarged scale of a portion of the screen-supporting surface shown in section in Figs. 1 and 9;

Fig. 9 is a sectional elevation view to an enlarged scale of a portion of the outer foraminous mantle of Fig. 1, showing the arrangement of the screen and its supporting surface;

Figs. 10 and 11 are sectional elevational views of modified forms of screens employed in my invention;

Figs. 12 and 13 are elevational views partly in section of further modifications of the machine shown in Fig. 1;

Fig. 14 is a sectional elevational view of a somewhat modified form of the inner member shown in Fig. 1; and Fig. 15 is a fragmentary sectional view of a slightly modified form of gearing shown in Fig. 6.

1 represents any suitable frame of the machine and 2 a shaft journaled in the top bearing 3 and the footstep 4, with which the base 5 of the machine is provided. The said shaft 2 is conveniently rotated as by the belt 6 passing over the pulley 7 fixed on the said shaft, which has fixed to it the hub 8 of the disk 9, rigidly connected to the annular disk 10 through the impeller blades 11. The outer edge of the disk 10 forms a rigid structure with the conical shell 12 and the foraminous mantle 13, which latter may be cylindrical as shown in Fig. 1, but which in many cases would preferably also be conical as shown in Figs. 5 and 7. The mantle 13 is provided near its lower end with the flange 14 and below this with the nonforaminous downward extension 15, as will be clear from the drawings.

16 represents a sleeve surrounding the shaft 2 and resting on the gear 17 fixed to said shaft, so that the said gear acts as a collar for the said sleeve 16. Rigid with the upper end of the sleeve 16 and immediately below the hub 8 is the disk 18, the outer edge of which forms a rigid structure with the foraminous mantle 19 and the annular disk 20, extending inward from the lower edge of mantle 19 to the central opening 21, Fixed to the outside of mantle 19 are the helically disposed ribs 22, simulating the action of a screw conveyer, while 23 represents a plurality of impeller blades disposed on the inside of the mantle 19 and extending from the disk 18 to the annular disk 20 as shown. These said fan or impeller blades, when rotating, serve to force air through the perforations 24 with which the mantle 19 is provided, as will presently appear.

A gear 25 a little larger than the gear 17, is fixed to the lower end of the sleeve 16, and 26 represents a journal pin fixed with its shank 27 in the boss 28 formed on the base 5 of the machine. Free to revolve on the journal 26 are mounted two rigidly connected gears 29 and 30, the gear 29 meshing with gear 17 and the gear 30 meshing with gear 25, all as will be clear from the drawings.

Entering the circular opening 34 in the annular disk 10 is the expanded outlet 35 of the circular end 36 of the feed supply duct 37, which duct is supported by the bracket 38 forming a continuation of the frame 1. The said duct 37 conveys the material 39 from any convenient source of supply and delivers it through the opening 34 to the inner ends of the impeller blades 11.

41 indicates a receiver for the liquid 42 forced by centrifugal action from the material 39 in the space 40 and discharged through the perforations 43 in the exterior mantle 13, and the said receiver is provided with a flange 44, an inner ledge 45, and an outlet 46 for the liquid, as shown. The receiver 41 is further extended downwardly as at 47 and provided with a frusto-conical bottom 48, and a spout 50 adapted to discharge the separated solids into a suitable receptacle, not shown.

The operation of the mechanism, so far as has been disclosed, is as follows:

Power being applied to the pulley 7 by the belt 6, the shaft 2 is revolved which in turn rotates the sleeve 16 through the gears 17, 29, 30 and 25 at a somewhat slower rate than that of the said shaft 2. At the same time the material 39, which may consist of a mixture of liquid and a granular aggregate, flows from the outlet 35 onto the central part of the rapidly rotating disk 9, whereby frictional contact sufficient rotary motion is imparted to said material to drive it outward by centrifugal action. When the material 39 in this outward movement reaches the inner ends of the impeller blades 11 these gradually intensify and make more positive the said centrifugal action after the manner of a centrifugal pump runner, thereby forcing the said material against the inner surface of the conical shell 12, which, by its inclination, assists the downward deflection of the said material into the space 40 between the exterior mantle 13 and the interior mantle 19. Within the space 40 the said material 39 comes into contact with the spiral conveyer blades 22 carried by the mantle 19. Owing to the speed reducing action of the gear train 17, 29, 30 and 25, the said mantle 19 and its spirals 22 are revolved at a somewhat slower rate than the exterior mantle 13, which through shell 12, disk 10, blades 11 and disk 9 is rigid with the more rapidly revolving shaft 2. The more rapidly revolving mantle 13 will thus, through the friction of its inner surface on the material 39, pressed against it by centrifugal force, carry the said material circumferentially along with it, while the more slowly revolving spirals 22, will, by the difference of rotation thus exisiting, force the said material along the inner surface of mantle 13 in a downward direction and off the lower end 15 of the said mantle 13. In other words, after the material strikes the disk 9 it is held between said disk and the disk 10, and is gradually and forcibly brought up to a high speed of rotation by reason of the centrifugal force to which it is subjected, and of the positive action of the blades 11, which tend to force said material outwardly against the inclined rim 12. This gradual acceleration of the material relieves sudden strains on the machine and enables me to make it of a lighter construction than would otherwise be the case. And the high speed of rotation alone combined with the downwardly deflecting force of the incline 12 serves to cause a portion of the liquid to be at once expelled through the orifices 43, while the more slowly revolving spirals 22 hold the material under the influence of this high speed of rotation, for a time determined by the difference in speed between the mantles 13 and 19. These said spirals thus cause another portion of said liquid to pass through said orifices 43 while the material is pressed against and moved transversely of the mantle 13. The escaping liquid 42 is caught in receiver 41 and may be conveyed away by one or more spouts 46 as shown.

The granular aggregate 49 of the material, thus deprived of its liquid escapes at the lower end 15 of mantle 13, is caught in the receiver 47, 48 from which it may be drawn off by a suitable number of spouts 50. The ring 14 prevents the liquid splashing about in the receiver 41 from entering the receiver 47, 48.

The impeller-blades 23 impart centrifugal force to the air entering by way of the opening 21 and thus force said air through the perforations 24 in the mantle 19, and through the material 39, escaping with the liquid into the receiver 41 from which the said air escapes at the top through the space 51, as indicated by the arrows. The air in blowing through the material 39 serves to scour off liquid adhering by capillary attraction or viscosity to the solid particles, which liquid could not be entirely removed by centrifugal action alone.

Should it be desirable to apply water or other fluid for washing or scouring purposes to the material 39, such water or fluid may be diverted to the inner edges of the impeller blades 23 and forced by them with the air through the said material.

The impeller blades 23 also act to relieve the pressure between the teeth of the gears 17, 29, 30 and 25, in that the said gears exert a retarding force on the mantle 19 and the spiral blades 22 in opposition to the forward drag on said blades, caused by the friction of the material 39 rotating at a more rapid rate than said blades. That is to say the said drag tends to pull the spiral blades 22 on mantle 19 forward along at the same rate of revolution as that of the mantle 13 and material 39, but the geared connection 17, 29, 30, 25 prevents this. Otherwise, the teeth of the said geared connection might be subjected to undesirable pressures due to the excess drag at which they operate, were it not for the action of the impeller blades 23 in causing a backward pull to diminish or neutralize the said forward pull and thus relieve the pressure between the teeth of said geared connection.

It must be understood that accurate rotative speed relation between the mantle 13 and the spirals 22 is a necessary condition for uniformity of operation and maximum output, and such an accurate speed relation can only be secured with toothed gearing, as a system of belts and pulleys could not produce uniform speed relation on account of the inevitable slipping of the belts.

It is obvious that if desired the sleeve 16 might be made the primary driven element, which in turn would then drive the shaft 2 and the parts rigid with it through the gear combination 25, 30, 29 and 17. In such case, however, there would be no relief of pressure on the gear teeth as long as shaft 2 and the parts rigid with it remained the faster revolving element. But if the gears 25 and 29 were made the smaller and the gears 30 and 17 the larger ones, as illustrated in Fig. 12, thereby reversing the condition shown in Fig. 1, the sleeve 16 with mantle 19 would then become the faster revolving element and shaft 2 with mantle 13 the slower revolving element, in which case the forward drag on mantle 13 through the material 39 inside of it being traversed by the faster moving blades 22 would be counteracted more or less by the reaction of the material behind while being accelerated by the blades 11 rigid with mantle 13. The pressure on the teeth of the said gearing 17, 29, 30, 25 would thereby be relieved through the reaction on blades 11 in a similar manner as by the fan blades 23, when these are the slower rotating element, as shown in the construction illustrated by Fig. 1. The variation of arrangement just described may be preferable for some classes of material.

On the other hand if the gears 25 and 17 were both driven from a pair of rigidly connected gears 29 and 30, which themselves were driven from a source of power such as the belt 54 shown in Fig. 13, no reduction of pressure on the gear teeth of one pair could be obtained by the reaction due to the material and substances used in its treatment being accelerated in their passage through the machine or by other resistances that might be introduced.

The inner member comprising the spiral conveyer blades 22 and the air impeller blades 23 may also be varied in construction in the manner shown in Fig. 14, in which the disk 18 is omitted, the said impeller blades 23 being extended inwardly and attached to the sleeve 16, so that mantle 19 is supported by them. Although the annular lower disk 20 is also omitted in the illustration, it would be retained in all such cases where the object of the impeller blades 23 is to drive air through the material treated, and not merely to provide resistance to rotation for the purpose of relieving the teeth of the gearing 17, 29, 30, 25 as explained in connection with Fig. 1, because the disk 20 would then prevent the escape of air at the lower edge of impeller blades 23. Such escape at the upper edge of 23 may not be an objection, since at that point it would have to pass through the material treated in order to escape, and would thus aid in driving off some of the liquid.

Fig. 5 shows a modified form of the invention, differing in essential details from that shown in Fig. 1, in that in Fig. 5 the exterior mantle 13 and interior mantle 19 are made conical, increasing in diameter in the direction of travel of the material 39 through space 40 between the said two mantles. By this construction the movement of said material through said space is aided by the component of centrifugal force thus introduced acting in a direction parallel to the axis of rotation, thereby further reducing the pressure on the teeth of the gearing 17, 29, 30, 25 producing the difference in rotation between mantles 13 and 19. The gears 29 and 30 are mounted somewhat differently from Fig. 1, being here shown as fixed on a short shaft 31 revolving in brackets 32 fixed to the frame 33.

In the present case also, the interior mantle 19 is rigidly connected through the disk 118 and hub 108 with the shaft 2, driven from the source of power by pulley 7 and belt 6, and constitutes the faster revolving element. The external mantle 13 is connected at its larger lower end by a number of short columns 54 to the annular disk 55, joined at its central opening to the ring 56, rigidly connected to the sleeve 16 as by the arms 57, which are inclined after the manner of a propeller so as to aid in driving the air into the interior of mantle 19. Mantle 13 is thus rigidly connected with the larger gear 25 and is driven at the slower rate of revolution through gears 30, 29 and 17 from shaft 2, as will be readily apparent.

The impeller blades 111 for accelerating the material are in this case attached to disk 118 so that such acceleration, as well as the acceleration of the air by impeller blades 23, is performed by parts rigid with the interior mantle 19. The blades 22 on said mantle will therefore tend to drag along the slower moving material 39 and exterior mantle 13 carrying said material, thereby producing a forward pressure on the teeth of gear connection 17, 29, 30, 25 which provides the retarded motion of mantle 13 in the manner above disclosed. Any form of resistance to the rotation of mantle 13 would tend to reduce the pressure on the said gear teeth, and in Fig. 5 such resistance is provided by the friction of a brakeshoe 58 guided by its shank 59 in the bracket sleeve 60 on frame casing 33 and pressed by the spring 61 against the annular brake surface 62 on the bottom of disk 55. A brake is of course not the only means to obtain the result sought, and the example of a brake is only advanced to show that the desired resistance may be obtained by a variety of means.

In Fig. 5 the method of supply is not by an inclined channel as in Fig. 1 but by means of the screw conveyer 63 conveying the material 39 along the trough 64 having the bottom 65 into the vertical receiver 36. In this case also the top bearing for the shaft 2 is formed by the short sleeve 165 rigid with the disk 118 and revolving with it. The journal for the said bearing 165 is provided by the stationary short shaft 66 fixed in the conical hub 67 rigid with the receiver 36 by means of the ribs 68. Such a construction provides a less restricted passage, which may be desirable with some materials that do not flow readily.

The liquid discharged through the perforations 43 of the mantle 13 is in this case not discharged directly into a stationary receiver as in Fig. 1, but is here first caught in a revolving casing 168 rigidly connected to the lower end 69 of mantle 13. The upper end of said casing 168 is open and has a circular lip 70 projecting over the inner wall 45 of the stationary liquid receiver 42. The liquid caught in the casing 168 is discharged over the lip 70 into the receiver 42 near the top of the machine, the casing 168 thus providing a means for causing the liquid discharge at any desired zone.

In the case of Fig. 5 the dried solids are discharged through the space between the short columns 54 into the receiver 47.

Fig. 6 illustrates a further modification of my invention suited to materials requiring a large screening surface for their treatment. Mantles 13 and 19 are consequently made extra long, so that they require a support at or near each end. Mantle 19, which is here the faster revolving element, is thus not only fixed to shaft 2 at the top by disk 118 and hub 108, but has a support provided near its lower end by the arms 71 extending from the inner edges of the impeller blades 23 to the hub 72 mounted on shaft 2. Mantle 13, the slower revolving member, is supported at its lower end in the same manner as in Fig. 5. At is upper end, support is obtained through the disk 10 the circumference of which is provided with a ball race 73, coacting with the balls 74 and a corresponding race 75 on the inner edge of the disk 110, rigid with the faster revolving mantle 19.

As in the case of Fig. 5 the liquid discharged through the perforations 43 of the mantle 13 is caught in a revolving casing 168 rigid with mantle 13. But in this case the liquid is discharged at the bottom by way of holes 76 made through the short columns 54, the escape of liquid at the top being prevented by the cover 177. By this arrangement the liquid is discharged below the dried solids, which has the advantage that splashes overflowing from the liquid receiver 42 cannot drip into the said solids in receiver 47.

The dried solids are discharged as in the case of Fig. 5 through the spaces between the hollow columns 54 into the receiver 47. The receiver 47 is in this case comparatively shallow and the solids are removed therefrom in a continuous manner by the scraper blades 77 attached above to the slowly rotating annular cover plate 78, which scrape the said solids toward one or more discharge spouts 150. The plate 78 is supported upon rollers 79 to reduce friction and is shown driven by a rope 80 passing over the sheave 81 rigid with plate 78. One or more rollers 82 are provided to maintain plate 78 in position against the pull of the rope 80.

The gearing fixing the speed relation of mantles 13 and 19 differs from that previously described, inasmuch as the two rigidly connected gears 129 and 130, meshing with the coaxial gears 17 and 25, are in this case internal gears, thereby securing more liberal tooth contact and preventing the lubricant being thrown off by centrifugal force, which results in smoother operation and longer wear. To this end the said internal gears 129 and 130 are attached through the conical shell 83 to the disk 84 which by its hub 85 is fixed to the lower end of the spindle 131. 91 shows an annular cover-plate to prevent oil being splashed out of the system of gearing. The spindle 131 is formed with a collar 88 at its upper end and revolves in the sleeve 86 supported by the bracket 87 from the frame 1 of the machine, while the lower end of sleeve 86 is provided with a bracket extension 88, the end of which forms a bearing 104 for the lower end of shaft 2 as will be clear from the drawing.

The pressure between the teeth of the gears 17, 129, 130 and 25 is relieved, as in the previously described cases, by providing resistance to rotation of the slower rotating member, which in the present case is the exterior mantle 13, and which to this end carries the fan blades 89 fixed to the disk 10 and shell 12 rigid with 13.

In the modified arrangement of the gearing 17, 129, 130, 25, shown in Fig. 15, the position of the axis 131, instead of being beyond the circumference of gear 25 as in Fig. 6, is entirely below the foot step 104 of shaft 2. By this arrangement the center line of 131 can be brought very close to the extended center line of shaft 2, so that the internal gears 129 and 130 become much smaller in diameter than would be possible with the arrangement shown in Fig. 6. The said internal gears 129 and 130 thus coincide more nearly with the external teeth of the gears 17 and 25, with which they mesh, and there will thus be a larger number of teeth in contact at the same time, than would be possible with the construction shown in Fig. 6. Further the flanks of the teeth of all the gears will approach more nearly to a radial line, all of which results in smoother running, better wearing qualities and improved facility of lubrication.

The brake shoe 58 in Fig. 5 has the advantage that the amount of resistance to rotation can be readily varied to suit the viscosity of the material treated by exchanging the spring 61. Similarly the outside fan blades 89 are easily accessible for trimming or exchanging to vary their area and thus their resistance to rotation. But in many other cases it would be desirable to make the resistance to rotation, needed for the slower rotating member in order to relieve the pressure between the teeth of gearing 17, 29, 30, 25, in the constructions shown in Figs. 5 and 6, serve a useful purpose in the treatment of the material. The brake shoe 58 in Fig. 5 and the outside fan blades 89 in Fig. 6 cause a waste of energy, which may be objectionable in many cases. In order to utilize the necessary work of accelerating the material by the impeller blades 111, and of the air by the fan blades 23, in Figs. 5 and 6 for the purpose of relieving the pressure between the teeth of the gearing 17, 29, 30, 25, the inner element 19, with which the said impeller blades 111 and 23 are rigid, must rotate slower than the outer element 13. This can be accomplished by making the gear 25 on sleeve 16 smaller than gear 17 on shaft 2, and correspondingly interchanging the diameters of gears 29 and 30 in Fig. 5 and of gears 129 and 130 in Fig. 6. It will also be necessary then to make sleeve 16, and therefore the outer mantle 13 rigid with it, the primarily driven element, by rigidly mounting the pulley 7, or other driving appliance upon said sleeve 16.

Fig. 7 illustrates a still further modified form of my invention in which the machine is practically an inverted form of that shown in Fig. 1, the feed of material being into the bottom instead of the top. This construction has the same advantage pertaining to that shown by Fig. 6; i. e. discharging the dried solids above the liquid, and moreover brings the gear connection 17, 29, 30, 25 to the top of the machine, where it is in sight of attendants. The exterior mantle 13 is here the faster revolving element and like Fig. 6 has attached to it the casing 168, from which the liquid discharges at the bottom through openings 90. The course of the material after leaving the outer ends of the impeller blades 11 is upward through the space 40 between mantles 13 and 19, and the discharge of the dried solids takes place over the upper larger end 91 of the conical exterior mantle 13. The remainder of the construction and the operation will be obvious from what has been disclosed in connection with the preceding illustrations.

The foraminous surface of the exterior mantle 13 cannot be conveniently prepared by simply perforating its thickness with a vast number of close spaced holes sufficiently small to prevent the fine solid particles of the material being treated. The usual practice with the ordinary intermittently operating centrifugals is to perforate such mantles with a smaller number of larger holes, spaced some distance apart, and to cover the inner surface with a coarse wire screen, upon which is spread the fine screen of wire cloth or punched metal sheets, the coarse wire screen being placed beneath the fine screen to provide by its rough surface, channels for the liquid coming through the fine screen, by which channels the said liquid may reach and escape through the large holes in the body of the mantle.

Such an arrangement does, however, not afford a sufficiently true surface for a high speed continuously operating machine having internal conveyer blades such as 22 in the present invention, rotating with their edges necessarily in close proximity to the screening surface. In order to accurately and truly bed the fine screen cloth or sheets which I use with this apparatus, I have the inner surface of mantle 13 machined absolutely true and grooved with a large number of closely spaced channels 200, which may be crossed by another system of channels 201, at right angles to the first as is shown to an enlarged scale in a full view in Fig. 8 and in section in Fig. 9. Such a construction, with a single system of channels provides a large number of closely spaced ridges, and with crossing systems of channels, a checkwork of projecting surfaces upon which the actual screen affording the foraminous surface 113 is bedded as shown in Fig. 9. The body of mantle 13 is perforated in the channels 200, 201, with holes 92 considerably larger but much less numerous than those in the said screen 113, by which holes the liquid that has passed through the screen into the said channels, may escape outward. The screen 113 is preferably held in place at the end where the material comes on from the conical shell 12 by the small overlapping ledge 93, and may be prevented from being dragged along in an axial direction by the moving material, by the circular ridge 94 at the outlet end of mantle 13.

Where the solid particles of the material treated are of a gritty nature so that they would wear out the screen 113 very rapidly, it may be desirable to leave a layer of such gritty material permanently in place upon the said screen to take the wear of the moving material. A construction for holding such a permanent layer is shown in Fig. 10, where 95 is the permanent layer of such material, which is prevented from being carried along with the moving material, by a number of circular ridges 96. The screen 113 is then made in strips bedded between the ridges 96.

Some materials from which liquid is to be separated contain such very finely divided solid particles that screening material with sufficiently small apertures to retain such solids cannot be had. In such cases it is usual with gravity or suction filters to filter through a layer of finely divided solids mixed with coarse ones, the mixture resting upon a suitable screening surface. Such fine granular filtering material would probably be rapidly carried away by the moving material with an arrangement like that shown in Fig. 10, but this may readily be prevented by merely interposing between the moving material 39 and the permanent layer of filtering material held between ridges 96 as in the preceding case, another screen 97 laid over the tops of the ridges 96 as shown in Fig. 11.

It will now be clear, that in all the forms of the invention there is a rotating outer foraminous member and an interior conveying member, that these members are interconnected by a system of toothed gearing so proportioned that the interior member will rotate at a somewhat different speed from the outer member, and that one of the said members is rotated by means independent of said toothed gearing. Further, it will be seen that resistance is applied against the rotation of the slower rotating member to counteract to any desired extent the drag which the faster element exerts on the slower by the friction or viscosity of the material passing between them, the aim being to thereby reduce the pressure between the teeth of the aforesaid gearing, so that smoother operation, easier lubrication and reduction of wear are secured. On the other hand the reaction due to useful work done by the machine upon the material treated, or upon other substances used in its treatment, can also be applied in various ways to cause the desired resistance to rotation of the slower moving member.

In most cases air, and in some cases also a liquid, is forced through the said material by the action of impeller blades, thereby aiding centrifugal force in stripping the liquid off the solid particles of the material being treated, and, as disclosed in Fig. 7, the machine may be arranged so as to admit of feeding the material in from below.

It is obvious that those skilled in the art may vary the details of the construction, and the arrangement of parts constituting the apparatus, as well as the various steps constituting the process, without departing from the spirit of the invention, and therefore, I do not wish to be limited by the above disclosure except as may be required by the claims.

What I claim is:—

1. The process of separating liquids from solids which consists in gradually and forcibly bringing the material up to a high speed of rotation while holding the same between a pair of rotating surfaces; forcibly deflecting said material over the rim of one of said surfaces to expel a portion of the liquid present; holding said material against a foraminous mantle for a predetermined time after being thus deflected while revolving at said high speed, to expel another portion of said liquid; and blowing a jet of air through said material while so held, substantially as described.

2. The process of separating liquids from solids which consists in gradually and forcibly bringing the material up to a high speed of rotation; forcibly causing said material to change its direction of movement while still rotating at said speed; causing said rotating material to press against a foraminous diaphragm with a force sufficient to expel a portion of the liquid present; holding said material for a predetermined time against said diaphragm while subjecting it to a force moving it across the surface of said diaphragm at an angle to its direction of rotation, to remove another portion of the liquid present;

and causing a blast of air to pass through said material while being so moved, substantially as described.

3. The process of separating liquids from solids which consists in gradually and forcibly bringing the material to a high speed of rotation; causing said rotating material to impinge against a foraminous diaphragm with a force sufficient to expel a portion of the liquid present; forcibly causing said material to change its direction of movement while still rotating at said speed; holding said material for a predetermined time against the perforated surface of said diaphragm while subjected to a force moving it across said surface at an angle to its direction of rotation to remove another portion of the liquid present; blowing air through said material while so held; and preventing the liquid separated out from recombining with the solids recovered, substantially as described.

4. In an apparatus for continuously separating liquids from solids by centrifugal action, the combination of a central rotating shaft; a plurality of impeller blades rigidly associated with said shaft and adapted to impart a high speed of rotation to the material; an outer foraminous shell member adapted to receive said material on its inner surface; an interior conveyer member adapted to move said material over said surface; fan blades rigid with said member adapted to deliver an air blast through the rotating material; means for rotating one of the said members; and gear connections whereby said conveyer member may be rotated at a different speed from said shell member, substantially as described.

5. In an apparatus for continuously separating liquids from solids by centrifugal action, the combination of a central rotating shaft; a plurality of impeller blades connected to said shaft and adapted to impart a high speed of rotation to the material; an outer foraminous shell member provided with an inclined deflecting portion adapted to receive said material on its inner surface; an interior conveyer member adapted to move said material uniformly over said surface; a plurality of fan blades for driving a fluid through said rotating material which being so moved; means for rotating one of the said members; a toothed gear rigid with said outer member; a second gear of different diameter rigid with said conveyer member; and a rigidly connected pair of different sized toothed gears rotating on an axis parallel to said central shaft and meshing with the aforesaid gears, substantially as described.

6. In an apparatus for continuously separating liquids from solids by centrifugal action, the combination of a central rotating shaft; an outer foraminous shell member provided with a liquid deflecting flange, said member adapted to receive said material on its inner surface; an interior conveyer member adapted to move said material uniformly over said surface; fan blades rigid with said conveyer member; a gear with external teeth rigid with said outer member; a gear of different size with external teeth rigid with said conveyer member; and a rigidly connected pair of larger gears with internal teeth rotating on an axis parallel to said central shaft and meshing with the aforesaid external gears on the aforesaid members, substantially as described.

7. In an apparatus for continuously separating liquids from solids by centrifugal action; the combination of a rotating shell having a truly alined inner surface traversed by a multiplicity of grooves communicating with outlets to permit outward escape of the liquids, and a screen bedded on said truly alined surface, substantially as described.

8. In an apparatus for continuously separating liquids from solids by centrifugal action, a rotating foraminous shell having an inner layer of granular filtering material, and provided with circular ribs adapted to hold the said filtering material in place, substantially as described.

9. In an apparatus for continuously separating liquids from solids by centrifugal action, a rotating foraminous shell having internal circular ribs and a granular filtering material bedded between said ribs; and a screen covering the inner surface of said filtering material, substantially as described.

In testimony whereof I affix my signature in presence of two witnesses.

HANS C. BEHR.

Witnesses:
   BYRON B. COLLINGS,
   MARION L. THOMAS.